US010976399B2

(12) United States Patent
Cui et al.

(10) Patent No.: US 10,976,399 B2
(45) Date of Patent: *Apr. 13, 2021

(54) METHOD, DEVICE AND SYSTEM FOR POSITIONING TERMINAL (71) Applicant: Huawei Technologies Co., Ltd., Shenzhen (CN)

(72) Inventors: Jie Cui, Shenzhen (CN); Dengkun Xiao, Shenzhen (CN); Yongtong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

This patent is subject to a terminal disclaimer.

(21) Appl. No.: 16/154,024

(22) Filed: Oct. 8, 2018

(65) Prior Publication Data
US 2019/0086504 A1 Mar. 21, 2019

Related U.S. Application Data (63) Continuation of application No. 14/523,434, filed on Oct. 24, 2014, now Pat. No. 10,132,909, which is a continuation of application No. PCT/CN2013/074673, filed on Apr. 25, 2013.

(30) Foreign Application Priority Data

Apr. 27, 2012 (CN) .......................... 2012 1 0128609

(51) Int. Cl.
G01S 1/02 (2010.01)
H04W 64/00 (2009.01)

(52) U.S. Cl.
CPC .............. *G01S 1/02* (2013.01); *H04W 64/00* (2013.01)

(58) Field of Classification Search
CPC ........ G01S 1/02; G01S 3/8003; H04W 64/00; H04W 64/003; H04W 64/006
USPC .................................................. 342/450, 463
See application file for complete search history.

(56) References Cited

U.S. PATENT DOCUMENTS

| 5,646,857 A | 7/1997 | McBurney et al. |
| 6,999,780 B1 | 2/2006 | Wei |
| 7,856,238 B2 | 12/2010 | Krause et al. |

(Continued)

FOREIGN PATENT DOCUMENTS

| CN | 1897749 A | 1/2007 |
| CN | 101315421 A | 12/2008 |

(Continued)

OTHER PUBLICATIONS

U.S. Appl. No. 14/523,434, filed Oct. 24, 2014.

(Continued)

*Primary Examiner* — Erin F Heard
*Assistant Examiner* — Michael W Justice
(74) *Attorney, Agent, or Firm* — Leydig, Voit & Mayer, Ltd.

(57) ABSTRACT

Provided are a terminal positioning method, device and system, the method comprising: receiving three-dimensional positioning measurement information transmitted by a terminal; and acquiring the three-dimensional position information of the terminal according to the three-dimensional positioning measurement information.

13 Claims, 4 Drawing Sheets

(56) References Cited

U.S. PATENT DOCUMENTS

| | | | |
|---|---|---|---|
| 7,974,637 B1* | 7/2011 | Taveniku | G06Q 20/208 |
| | | | 455/456.1 |
| 8,838,132 B2* | 9/2014 | Prakash | G01S 5/0236 |
| | | | 455/456.1 |
| 8,938,210 B1* | 1/2015 | Otto | G16H 40/67 |
| | | | 455/404.2 |
| 9,261,370 B2 | 2/2016 | Poornachandran et al. | |
| 9,310,207 B2* | 4/2016 | Booij | A61B 5/1113 |
| 9,986,529 B2* | 5/2018 | Palanki | G01C 25/00 |
| 2003/0050077 A1 | 3/2003 | Toshihiro et al. | |
| 2003/0216142 A1 | 11/2003 | Torbjorn et al. | |
| 2006/0014517 A1 | 1/2006 | Barclay et al. | |
| 2006/0178107 A1 | 8/2006 | Taniguchi | |
| 2006/0240839 A1 | 10/2006 | Chen et al. | |
| 2007/0149208 A1* | 6/2007 | Syrbe | H04W 64/00 |
| | | | 455/456.1 |
| 2007/0171047 A1* | 7/2007 | Goodman | G01S 5/0072 |
| | | | 340/539.13 |
| 2008/0004796 A1 | 1/2008 | Schott et al. | |
| 2008/0100507 A1 | 5/2008 | Syrjarinne et al. | |
| 2008/0117102 A1 | 5/2008 | Syrjarinne et al. | |
| 2010/0049469 A1 | 2/2010 | Wirola et al. | |
| 2010/0125413 A1 | 5/2010 | Wang | |
| 2011/0001795 A1 | 1/2011 | Uhm | |
| 2011/0039576 A1* | 2/2011 | Prakash | H04W 64/00 |
| | | | 455/456.1 |
| 2011/0057836 A1* | 3/2011 | Ische | G01S 5/0236 |
| | | | 342/357.43 |
| 2011/0090123 A1 | 4/2011 | Sridhara et al. | |
| 2012/0046014 A1* | 2/2012 | Wachter | G01S 19/11 |
| | | | 455/411 |
| 2012/0072110 A1 | 3/2012 | Venkatraman | |
| 2012/0244882 A1 | 9/2012 | Wilson et al. | |
| 2013/0017840 A1 | 1/2013 | Moeglein et al. | |
| 2013/0035089 A1* | 2/2013 | Moritz | G01S 5/0018 |
| | | | 455/422.1 |
| 2013/0107038 A1 | 5/2013 | Ota et al. | |
| 2013/0150124 A1* | 6/2013 | Kim | G06F 16/9537 |
| | | | 455/556.1 |
| 2013/0154882 A1 | 6/2013 | Young | |
| 2013/0307696 A1* | 11/2013 | Booij | G01S 5/021 |
| | | | 340/686.6 |
| 2015/0031402 A1 | 1/2015 | Sridhara et al. | |
| 2015/0133145 A1* | 5/2015 | Palanki | G01C 25/00 |
| | | | 455/456.1 |
| 2016/0157204 A1 | 6/2016 | Fukuta et al. | |

FOREIGN PATENT DOCUMENTS

| | | | | |
|---|---|---|---|---|
| CN | 101512376 A | | 8/2009 | |
| CN | 201491271 U | | 5/2010 | |
| CN | 101975961 A | | 2/2011 | |
| CN | 101984643 A | | 3/2011 | |
| CN | 102036165 A | | 4/2011 | |
| CN | 201805551 U | | 4/2011 | |
| CN | 102075936 A | | 5/2011 | |
| CN | 102216734 A | | 10/2011 | |
| EP | 1821116 A1 | | 8/2007 | |
| EP | 2600654 A1 | | 6/2013 | |
| EP | 2600654 A1 | * | 6/2013 | H04W 64/003 |
| JP | 2006145340 A | | 6/2006 | |
| JP | 2009521133 A | | 5/2009 | |
| JP | 2009525483 A | | 7/2009 | |
| JP | 2012509652 A | | 4/2012 | |
| JP | 2012517746 A | | 8/2012 | |
| JP | 2012524906 A | | 10/2012 | |
| KR | 20060089672 A | | 8/2006 | |
| WO | 2007025143 A1 | | 3/2007 | |
| WO | 2007089182 A1 | | 8/2007 | |
| WO | 2010059935 A1 | | 5/2010 | |
| WO | 2010091424 A2 | | 8/2010 | |
| WO | 2010124011 A2 | | 10/2010 | |
| WO | 2012014729 A1 | | 2/2012 | |

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 10)," 3GPP TS 36.355 V10.4.0, 3rd Generation Partnership Project, Valbonne, France (Dec. 2011).

3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10), 3GPP TS 36.305 V10.3.0, 3rd Generation Partnership Project, Valbonne, France (Sep. 2011).

* cited by examiner

METHOD, DEVICE AND SYSTEM FOR POSITIONING TERMINAL

CROSS-REFERENCE TO RELATED APPLICATIONS

This application is a continuation of U.S. patent application Ser. No. 14/523,434, filed on Oct. 24, 2014, which is a continuation of International Application No. PCT/CN2013/074673, filed on Apr. 25, 2013, which claims priority to Chinese Patent Application No. 201210128609.8, filed on Apr. 27, 2012. All of the aforementioned patent applications are hereby incorporated by reference in their entireties.

FIELD

Embodiments of the present invention relate to communication technology, and in particular to a method, a device and a system for positioning a terminal.

BACKGROUND

Positioning technology is a technology for determining geographic location of a terminal, and location information of the terminal can be obtained directly or indirectly via wireless communication network resource. For example, common positioning methods in Long Term Evolution (LTE) include a Global Navigation Satellite System (GNSS) positioning, an Observed Time Difference of Arrival (OT-DOA) positioning and an e-Cell Identification (e-CID) positioning. With the above positioning methods, only two-dimensional location information of the terminal is obtained. With the development of economy and society, three-dimensional location information of the terminal is required in more and more situations, so as to position the terminal more accurately to achieve different applications. However, the conventional positioning methods can not realize the three-dimensional positioning.

SUMMARY

Methods, devices and systems for positioning terminals are provided by the embodiments, to realize three-dimensional positioning of the terminal.

In a first aspect, a method for positioning a terminal is provided, including:

receiving three-dimensional positioning measurement information sent by the terminal; and deriving three-dimensional location information of the terminal based on the three-dimensional positioning measurement information.

In another aspect, a method for positioning a terminal is provided, including:

performing, by the terminal, a positioning measurement to obtain three-dimensional positioning measurement information; and sending, by the terminal, the three-dimensional positioning measurement information to a positioning server in such a way that the positioning server derives three-dimensional location information of the terminal based on the three-dimensional positioning measurement information.

In another aspect, a positioning server is provided, including:

a receiving unit, configured to receive three-dimensional positioning measurement information sent by a terminal; and a processing unit, configured to derive three-dimensional location information of the terminal based on the three-dimensional positioning measurement information received by the receiving unit.

In another aspect, a terminal is provided, including:

a positioning measurement unit, configured to perform a positioning measurement to obtain three-dimensional positioning measurement information; and a reporting unit, configured to send the three-dimensional positioning measurement information obtained by the positioning measurement unit to a positioning server in such a way that the positioning server derives three-dimensional location information of the terminal based on the three-dimensional positioning measurement information.

In another aspect, a system for positioning a terminal is provided, including the positioning server and the terminal described above in the invention.

With the methods, devices and systems for positioning terminals provided according to the embodiments, the terminal reports the three-dimensional positioning measurement information to the positioning server and the positioning server calculates three-dimensional location information of the terminal based on the three-dimensional positioning measurement information. In this way, the problem in the conventional technology that only two-dimensional location information of the terminal can be obtained is solved, and the positioning of the terminal is more accurate.

DETAILED DESCRIPTION

First Embodiment

Figure 1:
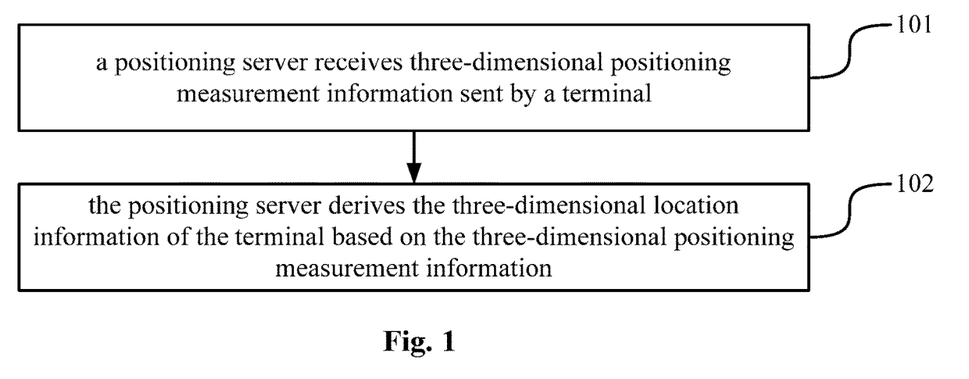
FIG. 1 is a schematic flow chart of a method for positioning a terminal provided according to an embodiment of the invention.

FIG. 1 is a schematic flow chart of a method for positioning a terminal provided according to an embodiment. The positioning method in the embodiment is performed by, for example, a positioning server. As shown in FIG. 1, the method may include steps 101-102 as follows.

In Step 101, a positioning server receives three-dimensional positioning measurement information sent by a terminal.

The positioning sever may be, for example, an evolved Serving Mobile Location Center (e-SMLC) of LTE. The terminal may be, for example, a mobile device such as a mobile phone.

The three-dimensional positioning measurement information refers to positioning information measured by the terminal to assist the positioning server in deriving the three-dimensional location information of the terminal.

For example, if the positioning server can obtain two-dimensional location information of the terminal by a common positioning method such as GNSS, the terminal may only measure an altitude value of the terminal itself, so that the positioning server may derive the three-dimensional location information of the terminal based on the two-dimensional location information and the altitude value, and in this case, the altitude value may be the three-dimensional positioning measurement information. For another example, if the positioning server can not obtain two-dimensional location information of the terminal, the terminal may measure its relative three-dimensional displacement information relative to the last effective positioning point, i.e., three-dimensional displacement information, so that the positioning server may derive the three-dimensional location information of the terminal by combining the relative three-dimensional displacement information with the location of the last effective positioning point, and in this case, the relative three-dimensional displacement information may be the three-dimensional positioning measurement information.

In Step 102, the positioning server derives the three-dimensional location information of the terminal based on the three-dimensional positioning measurement information.

As the examples in Step 101, the positioning server may derive the three-dimensional location information of the terminal based on the three-dimensional positioning measurement information reported by the terminal and other auxiliary information.

With the method for positioning the terminal provided according to the embodiment, the positioning server receivers the three-dimensional positioning measurement information reported by the terminal and calculates the three-dimensional location information of the terminal based on the three-dimensional positioning measurement information. In this way, the problem in the conventional technology that only two-dimensional location information of the terminal can be obtained is solved, and the positioning of the terminal is more accurate.

Second Embodiment

Figure 2:
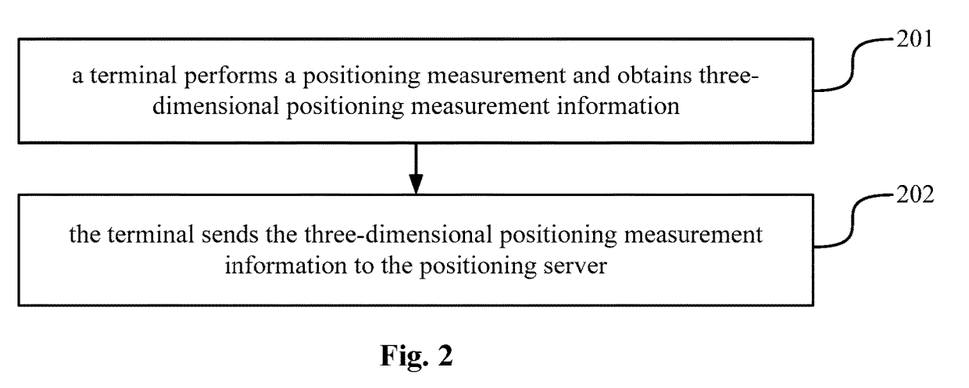
FIG. 2 is a schematic flow chart of a method for a positioning terminal provided according to another embodiment of the invention.

FIG. 2 is a schematic flow chart of a method for positioning a terminal provided according to another embodiment. The positioning method in the embodiment is performed by, for example, a terminal. As shown in FIG. 2, the method may include steps 201 to 202 as follows.

In Step 201, the terminal performs a positioning measurement to obtain three-dimensional positioning measurement information.

In implementation, there are multiple ways for the terminal to obtain the three-dimensional positioning measurement information. For example, if the three-dimensional positioning measurement information is an altitude value of the terminal, the terminal may obtain a gravity value by a gravimeter and obtain the altitude value based on a correspondence between gravity and altitude; or the terminal may obtain a barometric pressure value by a barometer and obtain the altitude value based on a correspondence between barometric pressure and altitude. For another example, if the three-dimensional positioning measurement information is relative three-dimensional displacement information of the terminal relative to a last effective positioning point, the terminal may track and capture a complete motion trail of the terminal in three-dimensional space by a gyroscope and an accelerometer, to obtain the relative three-dimensional displacement information.

In Step 202, the terminal sends the three-dimensional positioning measurement information to the positioning server.

The terminal reports the three-dimensional positioning measurement information obtained in Step 201 to the positioning server, and the positioning server can derive the three-dimensional location information of the terminal based on the three-dimensional positioning measurement information.

With the method for positioning the terminal provided according to the embodiment, the terminal reports the three-dimensional positioning measurement information to the positioning server and the positioning server calculates the three-dimensional location information of the terminal based on the three-dimensional positioning measurement information. In this way, the problem in the conventional technology that only two-dimensional location information of the terminal can be obtained is solved, and the positioning of the terminal is more accurate.

Third Embodiment

Figure 3:
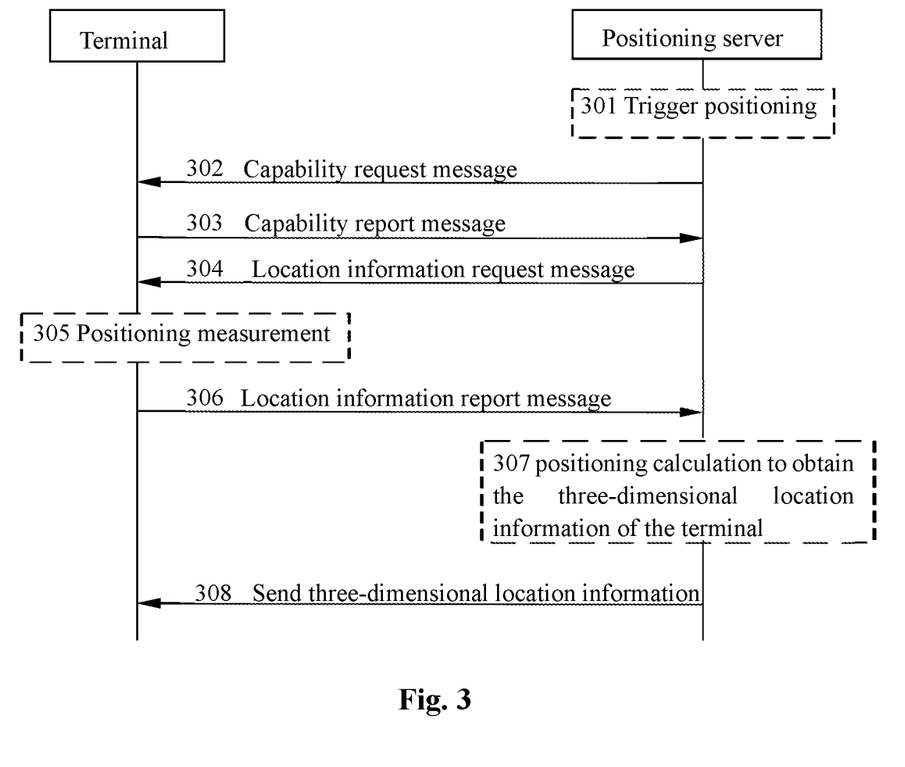
FIG. 3 is a schematic diagram of a signaling of a method for positioning a terminal provided according to another embodiment of the invention.

FIG. 3 is a schematic diagram of a signaling of a method for positioning a terminal provided according to another embodiment. The method for positioning the terminal is illustrated from the perspective of both a terminal and a positioning server in the embodiment. As shown in FIG. 3, the method may include steps 301 to 308 as follows.

In Step 301, the positioning server receives a trigger message of the positioning terminal.

The trigger message of the positioning terminal refers to an indication message for informing the positioning server to position a terminal. The entity for triggering the positioning server may be, for example, a terminal, a Mobility Management Entity (MME), the positioning server itself, i.e., the e-SMLC, or other entities at network side.

In Step 302, the positioning server sends a capability request message to the terminal, with the capability request message including three-dimensional positioning capability request information for the terminal.

The capability request message sent from the positioning server to the terminal may be "request capabilities" (requesting capabilities (of the terminal)) in LTE Positioning Protocol (LPP), and the "request capabilities" in the LPP is a signaling with which the positioning sever e-SMLC requests the terminal to report terminal capability information, so that the positioning server may choose an appropriate positioning calculation method based on the terminal capability information. The structure of the "request capabilities" is shown as follows:

```
-- ASN1START
RequestCapabilities ::= SEQUENCE {
    criticalExtensions              CHOICE {
        c1                              CHOICE {
            requestCapabilities-r9          RequestCapabilities-r9-IEs,
```

```
            requestCapabilities-r12           RequestCapabilities-r12-IEs,
            spare3 NULL, spare2 NULL, spare1 NULL
        },
        criticalExtensionsFuture    SEQUENCE { }
    }
}
RequestCapabilities-r9-IEs ::= SEQUENCE {
        commonIEsRequestCapabilities     CommonIEsRequestCapabilities    OPTIONAL,--
Need ON
        a-gnss-RequestCapabilities       A-GNSS-RequestCapabilities      OPTIONAL,--
Need ON
        otdoa-RequestCapabilities        OTDOA-RequestCapabilities       OPTIONAL,-- Need
ON
        ecid-RequestCapabilities         ECID-RequestCapabilities        OPTIONAL,
        -- Need ON
epdu-RequestCapabilities             EPDU-Sequence                   OPTIONAL,-- Need
ON
    ...
}
RequestCapabilities-r12-IEs :: SEQUENCE {
        commonIEsRequestCapabilities      CommonIEsRequestCapabilities   OPTIONAL,
        -- Need ON
        a-gnss-RequestCapabilities        A-GNSS-RequestCapabilities     OPTIONAL,--
Need ON
        otdoa-RequestCapabilities         OTDOA-RequestCapabilities      OPTIONAL,-- Need
ON
        ecid-RequestCapabilities          ECID-RequestCapabilities       OPTIONAL,
        -- Need ON
epdu-RequestCapabilities              EPDU-Sequence                  OPTIONAL,-- Need
ON
3dPositioning-ReuqestCapabilities     3DPositioning-ReuqestCapabilities OPTIONAL,  --
Need ON
    ...
}
-- ASN1STOP
```

Referring to the foregoing structure of the capability request message, i.e., the "request capabilities", the three-dimensional positioning capability request information for the terminal in the embodiment is the foregoing "3d positioning-request capabilities" (requesting three-dimensional positioning capability (of the terminal)) in the "requestcapabilities-r12-IEs::SEQUENCE { . . . }". The structure of the "3d positioning-request capabilities" is shown as follows:

```
-- ASN1START
3DPositioning-ReuqestCapabilities ::= SEQUENCE {
    ...
}
-- ASN1STOP
```

That is, the positioning server inquires of the terminal about the measurement capability supported by the terminal via the foregoing "3d positioning-request capabilities".

In Step 303, the terminal returns a capability report message to the positioning server, with the capability report message including the three-dimensional positioning capability information of the terminal.

The capability report message returned by the terminal to the positioning server may be the "provide capabilities" (providing capabilities (of the terminal)) in the LPP. The "provide capabilities" is a signaling with which the terminal reports its measurement capability to the positioning server. The structure of the "provide capabilities" is shown as follows:

```
-- ASN1START
ProvideCapabilities ::= SEQUENCE {
    criticalExtensions           CHOICE {
        c1                        CHOICE {
            provideCapabilities-r9        ProvideCapabilities-r9-IEs,
            provideCapabilities-r12       ProvideCapabilities-r12-IEs,
            spare3 NULL, spare2 NULL, spare1 NULL
        },
        criticalExtensionsFuture    SEQUENCE { }
    }
}
ProvideCapabilities-r9-IEs ::= SEQUENCE {
        commonIEsProvideCapabilities        CommonIEsProvideCapabilities
OPTIONAL,
        a-gnss-ProvideCapabilities          A-GNSS-ProvideCapabilities
OPTIONAL,
        otdoa-ProvideCapabilities           OTDOA-ProvideCapabilities       OPTIONAL,
        ecid-ProvideCapabilities            ECID-ProvideCapabilities        OPTIONAL,
        epdu-ProvideCapabilities            EPDU-Sequence                   OPTIONAL,
```

```
...
}
ProvideCapabilities-r12-IEs ::= SEQUENCE {
    commonIEsProvideCapabilities            CommonIEsProvideCapabilities
    OPTIONAL,
    a-gnss-ProvideCapabilities      A-GNSS-ProvideCapabilities      OPTIONAL,
    otdoa-ProvideCapabilities       OTDOA-ProvideCapabilities       OPTIONAL,
    ecid-ProvideCapabilities        ECID-ProvideCapabilities        OPTIONAL,
    epdu-ProvideCapabilities        EPDU-Sequence                   OPTIONAL,
    3dPositioning-ProvideCapabilities 3DPositioning-ProvideCapabilities   OPTIONAL,
    ...
}
-- ASN1STOP
```

The capability report message, i.e., the three-dimensional positioning capability information of the terminal included in the "provide capabilities" signaling refers to the "3d positioning-provide capabilities" (providing three-dimensional positioning capabilities (of the terminal)). An exemplary structure of the "3d positioning-provide capabilities" is shown as follows:

```
-- ASN1START
3DPositioning-ProvideCapabilities ::= SEQUENCE {
    3DPositioning-Mode    BIT STRING { HeightMeaSup        (0)
                                       VerticalMovMeaSup   (1)
                                       AngleMeaSup         (2)
                                       VelocityMeaSup      (3) } (SIZE (1..x)),
    ...,
}
-- ASN1STOP
```

The foregoing "3D positioning-mode" is a bit stream with which the terminal indicates the three-dimensional positioning mode supported by the terminal itself. The bit stream includes x bit(s), and each bit represents one measurement capability supported by the terminal, such as an altitude measurement or a horizontal displacement measurement. The value of x may be determined by future improvement of terminal capability, that is, the value of x is increased if the terminal can support more and more measurement capabilities in the future, and correspondingly the number of bits of the bit stream is increased.

The foregoing exemplary structure of the "3d positioning-provide capabilities" is taken as an example. In the exemplary structure, x=4, i.e., the bit stream includes four bits and the length of the bit stream is 4. The "(0), (1), (2) and (3)" in the foregoing structure are numbers of the bits, i.e., the zero bit, the first bit . . . . Each bit represents a three-dimensional positioning measurement mode supported by the terminal. For example, the zero bit "Height Mea Sup" represents an altitude measurement, the first bit "Vertical Mov Mea Sup" represents a horizontal displacement measurement, the second bit "Angle Mea Sup" represents a terminal angle variation measurement, and the third bit "Velocity Mea Sup" represents a velocity measurement. Each bit is set to be "0" or "1" to indicate whether the corresponding measurement mode is supported. "1" may be used to represent that the measurement mode is supported and "0" may be used to represent that the measurement mode is not supported. For example, 1000 represents that the altitude measurement is supported, 0100 represents that the horizontal displacement measurement is supported, 0010 represents that the terminal angle variation measurement is supported, and 0001 represents that the velocity measurement is supported. 1100 represents that both the altitude measurement and the horizontal displacement measurement are supported, and 0000 represents that none of the measurement modes is supported. The terminal may report its measurement capability based on its own conditions. All the bits of the bit stream are set to be 0 if the terminal does not have three-dimensional positioning measurement capability.

In Step 304, the positioning server sends a location information request message to the terminal.

The positioning server may choose an appropriate positioning mode based on the measurement capability of the terminal after obtaining the measurement capability supported by the terminal. For example, if the terminal supports the altitude measurement, the positioning server may choose a positioning mode of obtaining two-dimensional location information of the terminal by a common two-dimensional positioning method (for example, GNSS, OTDOA) and deriving the three-dimensional location information of the terminal based on the two-dimensional location information and altitude information. If the terminal supports the three-dimensional displacement measurement, the positioning server may choose a positioning mode of informing the terminal to obtain a relative three-dimensional displacement relative to a certain reference point and deriving three-dimensional location information of the terminal by the positioning server based on location information of the reference point and the relative three-dimensional displacement.

The positioning server sends the location information request message to the terminal after determining the positioning mode. The location information request message is "request location information" (requesting position information (of the terminal)). The "request location information" of the LPP is configured to instruct the terminal to acquire three-dimensional positioning measurement information corresponding to the three-dimensional positioning capability information after the positioning server acquires the three-dimensional positioning capability information of the terminal. The positioning server requests the terminal to assist in measuring the three-dimensional positioning measurement information required in the positioning. In addition, the positioning server may send parameters required in the assistant measurement of the terminal by attaching the parameters in the "request location information". For example, if the terminal is required to measure the relative three-dimensional positioning measurement information relative to a reference point, the positioning server may inform the terminal of the reference point information via the "request location information". The structure of the "request location information" is shown as follows:

```
-- ASN1START
RequestLocationInformation ::= SEQUENCE {
    criticalExtensions          CHOICE {
        c1                      CHOICE {
            requestLocationInformation-r9RequestLocationInformation-r9-IEs,
            requestLocationInformation-r12         RequestLocationInformation-r12-IEs,
            spare3 NULL, spare2 NULL, spare1 NULL
        },
        criticalExtensionsFuture        SEQUENCE { }
    }
}
RequestLocationInformation-r9-IEs ::= SEQUENCE {
    commonIEsRequestLocationInformation CommonIEsRequestLocationInformation
    OPTIONAL,-- Need ON
    a-gnss-RequestLocationInformation       A-GNSS-RequestLocationInformation
    OPTIONAL,-- Need ON
    otdoa-RequestLocationInformationOTDOA-RequestLocationInformation OPTIONAL,
    -- Need ON
    ecid-RequestLocationInformation         ECID-RequestLocationInformation
    OPTIONAL,-- Need ON
    epdu-RequestLocationInformation         EPDU-Sequence
    OPTIONAL,-- Need ON
    ...
}
RequestLocationInformation-r12-IEs ::= SEQUENCE {
    commonIEsRequestLocationInformation             CommonIEsRequestLocationInformation
    OPTIONAL,-- Need ON
    a-gnss-RequestLocationInformation               A-GNSS-RequestLocationInformation
    OPTIONAL,-- Need ON
    otdoa-RequestLocationInformation        OTDOA-RequestLocationInformation
    OPTIONAL,-- Need ON
    ecid-RequestLocationInformation         ECID-RequestLocationInformation
    OPTIONAL,-- Need ON
    epdu-RequestLocationInformation         EPDU-Sequence
    OPTIONAL,-- Need ON
    3dPositioning-RequestLocationInformation    3DPositioning-RequestLocationInformation
    OPTIONAL,-- Need ON
    ...
}
-- ASN1STOP
```

The structure of the "3d positioning-request location information" (requesting three-dimensional location information (of the terminal)) in the "request location information" is shown as follows:

```
-- ASN1START
3DPositioning-RequestLocationInformation ::= SEQUENCE {
lppPositioningID        LPPPositioningID        OPTIONAL,
...
}
-- ASN1STOP
```

The reference point information of which the positioning server needs to inform the terminal is the "LPP positioning ID" in the foregoing "3d positioning-request location information" (requesting three-dimensional location information (of the terminal)). The "LPP positioning ID" is an identifier of each positioning process. Each time the positioning server positions the terminal, the terminal and the positioning server record an identifier, i.e., an ID, for indicating the current positioning process. Therefore, both the terminal and the positioning server can find positioning information of each positioning process based on the ID. After the positioning, the positioning information of the current positioning process may be stored at the positioning server side, the positioning server may send the positioning information to the terminal, and the positioning information of the current positioning process may also be stored at the terminal side. As described above, the positioning server informs the terminal of the "LPP positioning ID", and the terminal may find the corresponding positioning information based on the ID, i.e., find the reference point.

In Step 305, the terminal performs a positioning measurement to obtain the three-dimensional positioning measurement information.

In this step, the terminal may measure altitude reference information, to obtain an altitude value of the terminal based on the altitude reference information, for example. The altitude reference information may be, for example, gravity information, barometric pressure information or even an altitude value. Alternatively, the terminal may measure three-dimensional displacement information, and the three-dimensional displacement information includes the displacements in X axis, Y axis and Z axis, which represent spatial movement information of the terminal.

Optionally, the foregoing three-dimensional positioning measurement information (for example, the altitude reference information, the three-dimensional displacement information) measured by the terminal may be an absolute measurement result or a relative measurement result relative to a certain reference point. For example, the foregoing altitude value of the altitude reference information may be an absolute altitude value measured by the terminal or a relative altitude value relative to a certain reference point measured by the terminal. For another example, the foregoing displacements in X axis, Y axis and Z axis in the three-dimensional displacement information may be absolute displacement values measured by the terminal or relative three-dimensional displacement values relative to a certain reference point measured by the terminal. For example, the terminal may acquire a relative displacement in X axis Δx relative to a reference point, an absolute displacement in Y axis Δy of the terminal and an absolute displacement in Z axis Δz of the terminal; or the terminal may acquire a relative displacement in X axis Δx relative to a reference point, a relative displacement in Y axis Δy relative to the reference point and an absolute displacement in Z axis Δz of the terminal. In implementation, the measurement and report of the terminal may be determined based on actual condition, and detailed description thereof is omitted herein.

The method of the relative measurement and the absolute measurement mentioned above are described in the following.

In a case that the three-dimensional positioning measurement information is a relative measurement result relative to a reference point, the terminal acquires the three-dimensional positioning measurement information relative to the reference point based on reference point information. For example, the positioning server may inform the terminal of the reference point information by the "request location information" (requesting location information (of the terminal)) such as the foregoing "LPP positioning ID". Alternatively, the reference point information may be acquired by the terminal from the terminal itself. In the case that the reference point information is acquired by the terminal from the terminal itself, the terminal may perform an accumulative measurement at the terminal side, for example. Specifically, as an example, the terminal may set a recording point by itself according to a recording period set by the terminal. In this case, if positioning information of some positioning points which have been effectively positioned is stored at the terminal side, such as a positioning point A and a positioning point B which have been effectively positioned and which are equivalent to previous location information of the terminal, the terminal may set the recording period as T and perform periodical positioning measurement relative to each of the foregoing positioning points. Specifically, as an example, the terminal may measure relative displacement information S1 relative to the positioning point A after one period T, relative displacement information S2 relative to the positioning point A after two periods T, relative displacement information relative S3 (S3+S1=S2) relative to S1 after one period T, or relative displacement information S4 relative to the positioning point B after one period T. The foregoing positioning point A, positioning point B and S1 may be referred to as recording points. If the positioning server informs the terminal that the positioning point A is the reference point, the terminal may report S2 as the measurement information relative to the positioning point A. S2 may be obtained by measuring directly by the terminal the relative displacement information relative to the positioning point A after two periods T, or may be obtained by an iteration operation of S3+S1=S2. The forgoing relative displacement information may be a three-dimensional relative displacement in three axes, or may be a two-dimensional relative displacement in two axes, or may be a one-dimension relative displacement in one axis. Alternatively, the terminal may take the location corresponding to S1 as a reference point, i.e., the reference point is selected by the terminal itself. In this case, the terminal needs to send the reference point information to the positioning server, so that the positioning server obtains the reference point information to perform subsequent calculation. For example, the terminal may report the reference point information and the three-dimensional positioning measurement information to the positioning server together.

An accumulative measurement of a gravimeter is taken as an example. If recorded gravity information of a certain location is $F1=Gm_1m_2/(R_1)^2$, and the gravity information measured at the point to be positioned is $F2=Gm_1m_2/(R_2)^2$, where F1 and F2 represent universal gravitation of the terminal at different locations, m1 and m2 represent mass of the terminal and mass of the earth respectively, R1 and R2 represent the distance between the terminal and the earth's center, and G is the gravitational constant, therefore, $\sqrt{F1/F2}=R_2/R_1$ is obtained. Information about a relative altitude ratio of the two locations may be determined based on a universal gravitation ratio measured by the gravimeter, and the altitude of the terminal at the positioning point may be calculated. For the accumulative measurement of the gravimeter, a relative altitude ratio relative to the last recording point may be measured, or a relative altitude ratio relative to location of the reference point may be measured; the principle thereof is similar to that in the foregoing description and the detailed description thereof is omitted herein.

In the relative measurement, the terminal generally needs to obtain reference point information, and then acquire relative measurement information relative to the reference point. The process of setting a measurement base point as a reference point by the terminal may be referred to as reset or calibration of the terminal, i.e., the reset or the calibration refers to that the terminal sets the reference point as a relative base point of the current measurement.

In a case that the three-dimensional positioning measurement information is an absolute measurement result, the measurement is not an accumulative process and the reference point is not needed. For example, for a gravimeter, the altitude at any location may be obtained by the gravity equation. As the equations shown in the foregoing accumulative measurement of the gravimeter, F1 may be measured by the gravimeter, and G, m1 and m2 may also be obtained, therefore, R1 may be calculated as the altitude of the terminal. For another example, for a barometer, the altitude at any location may be obtained based on correspondence between barometric pressure and altitude. Generally, the barometric pressure decreases by 1 mmHg (mercury column of 1 milliliter) as the altitude increases by 12 m, or the barometric pressure decreases by 100 Pa as the altitude increases by 9 m, therefore, the altitude information of the terminal may be obtained by barometer measurement of the terminal. In the above measurements, absolute measurement results (for example, altitude), rather than relative displacement obtained based on a last recording point, are obtained.

In Step 306, the terminal sends a location information report message to the positioning server, with the location information report message including the three-dimensional positioning measurement information obtained by the terminal.

After the measurement, the terminal sends a location information report message to the positioning server, to report the obtained three-dimensional positioning measurement information to the positioning server. The location information report message is "provide location information" (providing location information (of the terminal)). The terminal sends the positioning measurement information to the positioning server via the "provide location information" of the LPP. The structure of the "provide location information" is shown as follows:

Optionally, three-dimensional positioning measurement failure information, i.e., 3D positioning-error (three-dimensional positioning error), may be carried in the foregoing "3d

```
-- ASN1START
ProvideLocationInformation ::= SEQUENCE {
    criticalExtensions              CHOICE {
        c1                          CHOICE {
            provideLocationInformation-r9        ProvideLocationInformation-r9-IEs,
            provideLocationInformation-r12       ProvideLocationInformation-r12-IEs,
            spare3 NULL, spare2 NULL, spare1 NULL
        },
        criticalExtensionsFuture    SEQUENCE { }
    }
}
ProvideLocationInformation-r9-IEs ::= SEQUENCE {
    commonIEsProvideLocationInformation
                                    CommonIEsProvideLocationInformation
        OPTIONAL,
    a-gnss-ProvideLocationInformation       A-GNSS-ProvideLocationInformation
        OPTIONAL,
    otdoa-ProvideLocationInformation        OTDOA-ProvideLocationInformation   OPTIONAL,
    ecid-ProvideLocationInformation         ECID-ProvideLocationInformation
        OPTIONAL,
    epdu-ProvideLocationInformation         EPDU-Sequence
        OPTIONAL,
    ...
}
ProvideLocationInformation-r12-IEs ::= SEQUENCE {
    commonIEsProvideLocationInformation
                                    CommonIEsProvideLocationInformation
        OPTIONAL,
    a-gnss-ProvideLocationInformation       A-GNSS-ProvideLocationInformation
        OPTIONAL,
    otdoa-ProvideLocationInformation        OTDOA-ProvideLocationInformation   OPTIONAL,
    ecid-ProvideLocationInformation         ECID-ProvideLocationInformation
        OPTIONAL,
    epdu-ProvideLocationInformation         EPDU-Sequence
        OPTIONAL,
    3dPositioning-ProvideLocationInformation         3DPositioning-ProvideLocationInformation
        OPTIONAL,
}
-- ASN1STOP
```

The three-dimensional positioning measurement information reported by the terminal is in the "3d positioning-provide location information" (providing three-dimensional location information (of the terminal)) of the "provide location information". The structure of the "3d positioning-provide location information" is shown as follows:

positioning-provide location information" by the terminal if the terminal fails in the positioning measurement and fails to obtain the three-dimensional positioning measurement information. The "3D positioning-error" may be caused by, for example, abnormal positioning.

```
-- ASN1START
ECID-ProvideLocationInformation ::= SEQUENCE {
    3dPositioning-MeasurementInformation    3DPositioning-MeasurementInformation
        OPTIONAL,
    3dPositioning-Error                     3DPositioning-Error
        OPTIONAL,
    ...
}
-- ASN1STOP
```

The foregoing "3D positioning-measurement information" (three-dimensional positioning measurement information) is the three-dimensional positioning measurement information reported by the terminal. The three-dimensional positioning measurement information obtained in different positioning modes is different. For example, the three-dimensional positioning measurement information may be gravity information, barometric pressure information or three-dimensional displacement information. The structure of the "3D positioning-measurement information" will be illustrated in the following embodiments.

Optionally, the terminal may report the three-dimensional positioning measurement information by triggering an event. For example, the terminal may report the three-dimensional positioning measurement information upon receipt of a report instruction sent by the positioning server. Alternatively, the terminal may report the three-dimensional positioning measurement information periodically. For example, the terminal may measure and report the three-dimensional positioning measurement information according to a reporting period (the terminal may set the reporting period as the requirement of the positioning server). The reporting period is $\Delta T = T2 - T1 = T1 - T0$ if the terminal measures and reports the three-dimensional positioning measurement information at time points T0, T1 and T2.

In Step 307, the positioning server derives three-dimensional location information of the terminal based on the three-dimensional positioning measurement information.

The positioning server may determine an appropriate positioning calculation method after obtaining the three-dimensional positioning capability information of the terminal in Step 303. For example, the positioning server may acquire two-dimensional location information of the terminal and then derive three-dimensional location information of the terminal based on the two-dimensional location information and altitude reference information measured by the terminal. Alternatively, the positioning server may derive three-dimensional location information of the terminal based on reference point information and relative three-dimensional displacement information measured by the terminal.

The positioning server may acquire the two-dimensional location information of the terminal by a common measurement method. For example, the terminal may inform the positioning server via the "provide capability" that whether the terminal can acquire a GPS signal, and the positioning server may position the terminal by means of GPS positioning if the terminal can acquire a GPS signal; the positioning server may inform the terminal to assist in measuring parameters required in the GPS positioning. Alternatively, the positioning server may position the terminal by means of OTDOA or e-CID if the terminal can not obtain a GPS signal.

In addition, in each positioning process, the positioning server may record a positioning identifier, i.e., a positioning ID which is corresponding to the positioning process, so that the information of this positioning process may be found based on the ID in subsequent processes.

In Step 308, the positioning sever returns the location information to the terminal.

the positioning server, so that the positioning server calculates the three-dimensional location information of the terminal based on the reported three-dimensional positioning measurement information. In this way, the problem in the conventional technology that only two-dimensional location information of the terminal can be obtained is solved, and the positioning of the terminal is more accurate.

Based on the method for positioning the terminal described above, examples of three-dimensional positioning of the terminal are illustrated in the fourth embodiment to the seventh embodiment in the following. These examples all adopt the method for positioning the terminal described in the third embodiment, and the processes are basically the same, except the positioning modes are different and thus the measurement methods adopted by the terminal and the three-dimensional positioning measurement information obtained by the terminal are different. The following examples focus on the different processes, and the description of the same processes are omitted and may refer to the third embodiment.

Fourth Embodiment

In this embodiment, an accelerometer is provided in the terminal, and a relative altitude measurement result is obtained by the accelerometer. The terminal reports a corresponding measurement result based on a measurement result of the accelerometer. For example, the terminal reports the corresponding measurement result via the "provide location information" in the LPP, and the relative altitude measurement information is carried in the "3D positioning-measurement information". The structure of the "3D positioning-measurement information" is shown as follows:

```
-- ASN1START
3DPositioning-MeasurementInformation ::= SEQUENCE {
    measuredResultsList    MeasuredResultsList,
    ...
}
MeasuredResultsList ::= SEQUENCE (SIZE(1..y)) OF MeasuredResultsElement
MeasuredResultsElement ::= SEQUENCE {
    physCellId         INTEGER (0..503),
    cellGlobalId       CellGlobalIdEUTRA-AndUTRA        OPTIONAL,
    arfcnEUTRA         ARFCN-ValueEUTRA,
    systemFrameNumber
                       BIT STRING (SIZE (10))           OPTIONAL,
    lppPositioningID   LPPPositioningID    OPTIONAL,
    deltaX-Axis        DeltaX-Axis         OPTIONAL,
    deltaY-Axis  DeltaY-Axis         OPTIONAL,
    deltaZ-Axis        DeltaZ-Axis         OPTIONAL,
    ...
}
-- ASN1STOP
```

The positioning server may inform the terminal of the positioning result, i.e., three-dimensional location information of the terminal after positioning. In addition, the positioning server may further inform the terminal of the ID corresponding to the current positioning process, so that the terminal may find the positioning information corresponding to the positioning process based on the ID in subsequent processes.

With the method for positioning the terminal provided according to this embodiment, the terminal reports the three-dimensional positioning measurement information to The "phys Cell Id" represents a physical cell identifier, the "cell Global Id" represents a global terminal identifier, the "arfcnEUTRA" represents an absolute frequency point, and the "system Frame Number" represents a radio frame number, all these are auxiliary parameters. The "LPP Positioning ID" represents an ID of a positioning process that the accelerometer measures a reference point of a relative altitude value. The "Delta X-Axis" represents a relative displacement in X axis relative to the reference point of the positioning process corresponding to the "LPP Positioning ID", measured by the terminal, where the X axis may be in a direction of east or south and must be vertical to Y axis and Z axis in three-dimensional space. The "Delta Y-Axis" represents a relative displacement in Y axis relative to the reference point of the positioning process corresponding to the "LPP Positioning ID", measured by the terminal. The "Delta Z-Axis" represents a relative displacement in Z axis relative to the reference point of the positioning process corresponding to the "LPP Positioning ID", measured by the terminal.

In addition, the "LPP positioning ID" is null indicates that the relative measurement is an absolute measurement result

Fifth Embodiment

In this embodiment, a gravimeter is provided in the terminal, and a gravity value of the terminal is obtained by the gravimeter. The terminal reports gravity reference information via the "provide location information" in the LPP. The gravity reference information is carried in the "3D positioning-measurement information". The structure of the "3D positioning-measurement information" is shown as follows:

```
-- ASN1START
3DPositioning-MeasurementInformation ::= SEQUENCE {
    measuredResultsList    MeasuredResultsList,
    ...
}
MeasuredResultsList ::= SEQUENCE (SIZE(1..y)) OF MeasuredResultsElement
MeasuredResultsElement ::= SEQUENCE {
    physCellId         INTEGER (0..503),
    cellGlobalId       CellGlobalIdEUTRA-AndUTRA              OPTIONAL,
    arfcnEUTRA         ARFCN-ValueEUTRA,
    systemFrameNumber
                       BIT STRING (SIZE (10))                 OPTIONAL,
    lppPositioningID   LPPPositioningID      OPTIONAL,
    deltaX-Axis        DeltaX-Axis           OPTIONAL,
    deltaY-Axis  DeltaY-Axis                 OPTIONAL,
    deltaZ-Axis        DeltaZ-Axis           OPTIONAL,
    gravMeasurementResult GravMeasurementResult            OPTIONAL,
    ...
}
-- ASN1STOP
```

(for example, measured by a gravimeter, a barometer). "Measured Result List" represents a list of measurement results, which lists the measurement results of the relative displacement of the current terminal location relative to IDs of different positioning processes (corresponding to different positioning reference points). The length y of the list may be determined based on performance requirement of the terminal and the network side, i.e., based on actual requirements of positioning calculation, and this embodiment is not limited herein.

The two network elements of "Delta X-Axis" and "Delta Y-Axis" may be set to be null if the terminal can only provide altitude measurement information, therefore, the information reported in this embodiment is a relative altitude value, where the two network elements of "Delta X-Axis" and "Delta Y-Axis" are set to be null.

The horizontal and vertical movement velocities of the terminal may be reported via an original IE of TS36.355, i.e., via "Horizontal Velocity" and "Horizontal With Vertical Velocity".

The positioning server may find a corresponding positioning reference point based on the measurement result reported by the terminal. Specifically, the positioning server finds location information of the corresponding positioning reference point based on the "LPP positioning ID", where the location information may be an altitude value of the reference point measured by the positioning server previously, and the positioning server then obtains the current actual altitude value (i.e., absolute altitude) of the terminal based on the reported relative altitude value. The positioning server may measure current two-dimensional location information of the terminal by a common positioning method, and derive current three-dimensional location information of the terminal based on the two-dimensional location information and the actual altitude value.

The gravity reference information is the foregoing "gray measurement result" which represents the gravity reference information measured by the terminal with the gravimeter. The gravity reference information may be an absolute altitude value obtained by the terminal based on a gravity measured by the terminal with the gravimeter and a correspondence between gravity and altitude. Alternatively, the gravity reference information may be gravity information, i.e., a gravity measured by the terminal with the gravimeter, reported directly by the terminal, and the positioning server obtains an absolute altitude value of the terminal based on a correspondence between gravity and altitude after the gravity information is reported to the positioning server.

The positioning server obtains the absolute altitude value of the terminal based on the gravity reference information reported by the terminal. The positioning server further measures current two-dimensional location information of the terminal by using a common positioning method. The positioning server then derives current three-dimensional location information of the terminal based on the two-dimensional location information and the absolute altitude value of the terminal.

Sixth Embodiment

In this embodiment, a barometer is provided in the terminal, and a barometric pressure value at the location of the terminal is obtained by the barometer. The terminal reports barometric pressure reference information via the "provide location information" in the LPP. The barometric pressure reference information is carried in the "3D positioning-measurement information". The structure of the "3D positioning-measurement information" is shown as follows:

```
-- ASN1START
3DPositioning-MeasurementInformation ::= SEQUENCE {
    measuredResultsList    MeasuredResultsList,
    ...
}
MeasuredResultsList ::= SEQUENCE (SIZE(1..y)) OF MeasuredResultsElement
MeasuredResultsElement ::= SEQUENCE {
    physCellId         INTEGER (0..503),
    cellGlobalId       CellGlobalIdEUTRA-AndUTRA         OPTIONAL,
    arfcnEUTRA         ARFCN-ValueEUTRA,
    systemFrameNumber
                       BIT STRING (SIZE (10))            OPTIONAL,
    lppPositioningID   LPPPositioningID   OPTIONAL,
    deltaX-Axis        DeltaX-Axis        OPTIONAL,
    deltaY-Axis  DeltaY-Axis     OPTIONAL,
    deltaZ-Axis        DeltaZ-Axis        OPTIONAL,
    variometerMeasurementResult VariometerMeasurementResult   OPTIONAL,
    ...
}
-- ASN1STOP
```

The barometric pressure reference information is the foregoing "variometer measurement result" which represents barometric pressure reference information measured by the terminal with the barometer. The barometric pressure reference information may be an absolute altitude value obtained by the terminal based on a barometric pressure measured by the terminal with the barometer and a correspondence between barometric pressure and altitude. Alternatively, the barometric pressure reference information may be barometric pressure information, i.e., a barometric pressure measured by the terminal with the barometer, reported directly by the terminal, and the positioning server obtains an absolute altitude value of the terminal based on a correspondence between barometric pressure and altitude after the barometric pressure is reported to the positioning server.

The positioning server obtains the absolute altitude value of the terminal based on the barometric pressure reference information reported by the terminal. The positioning server further measures current two-dimensional location information of the terminal by using a common positioning method.

The positioning server then derives current three-dimensional location information of the terminal based on the two-dimensional location information and the absolute altitude value of the terminal.

Seventh Embodiment

Figure 4:
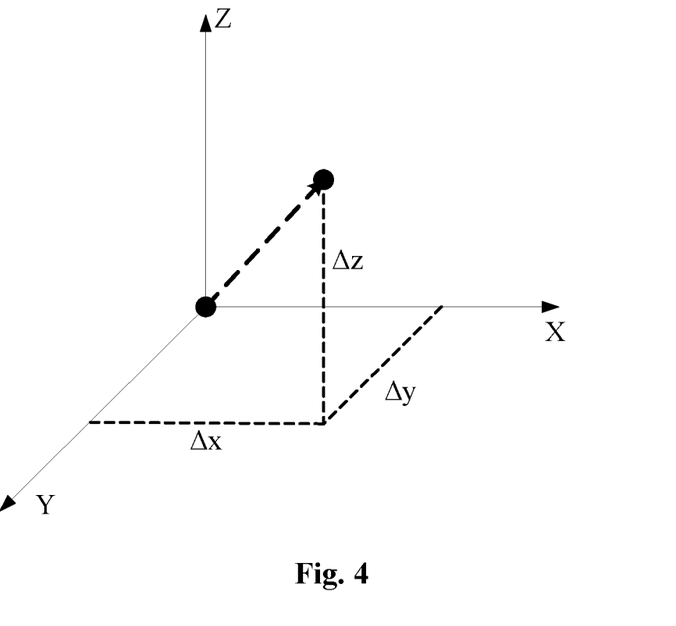
FIG. 4 is a schematic diagram of positioning measurement state of a method for positioning a terminal provided according to another embodiment of the invention.

In this embodiment, a gyroscope and an accelerometer are provided in the terminal, and a complete movement of the terminal in three-dimensional space is tracked and captured by the gyroscope and the accelerometer. FIG. 4 is a schematic diagram of positioning measurement state in a method for positioning a terminal provided according to another embodiment. As shown in FIG. 4, the terminal may measure three-dimensional displacement information of a positioning point relative to a reference point, i.e., $\Delta x$, $\Delta y$ and $\Delta z$. The ($\Delta x$, $\Delta y$, $\Delta z$) are overall displacement relative to the reference point. In this embodiment, the structure of the "3D positioning-measurement information" in the "provide location Information" reported by the terminal is shown as follows:

```
-- ASN1START
3DPositioning-MeasurementInformation ::= SEQUENCE {
    measuredResultsList    MeasuredResultsList,
    ...
}
MeasuredResultsList ::= SEQUENCE (SIZE(1..y)) OF MeasuredResultsElement
MeasuredResultsElement ::= SEQUENCE {
    physCellId         INTEGER (0..503),
    cellGlobalId       CellGlobalIdEUTRA-AndUTRA         OPTIONAL,
    arfcnEUTRA         ARFCN-ValueEUTRA,
    systemFrameNumber
                       BIT STRING (SIZE (10))            OPTIONAL,
    lppPositioningID   LPPPositioningID   OPTIONAL,
    deltaX-Axis        DeltaX-Axis        OPTIONAL,
    deltaY-Axis  DeltaY-Axis     OPTIONAL,
    deltaZ-Axis        DeltaZ-Axis        OPTIONAL,
    ...
}
-- ASN1STOP
```

The foregoing "LPP Positioning ID" is an ID of a positioning process corresponding to the reference point. In this embodiment, the "Delta X-Axis" is a relative displacement in X axis relative to the reference point of the positioning process corresponding to the "LPP Positioning ID", i.e., Δx, measured by the terminal. The "Delta Y-Axis" is a relative displacement in Y axis relative to the reference point of the positioning process corresponding to the "LPP Positioning ID", i.e., Δy, measured by the terminal. The "Delta Z-Axis" is a relative displacement in Z axis relative to the reference point of the positioning process corresponding to the "LPP Positioning ID", i.e., Δz, measured by the terminal.

The positioning server may find a corresponding positioning reference point based on the measurement result reported by the terminal. For example, the positioning server finds location information of the corresponding positioning reference point based on the "LPP positioning ID", where the location information may be three-dimensional location information of the reference point measured by the positioning server previously, and then the positioning server derives current three-dimensional location information of the terminal based on the reported three-dimensional relative displacement (Δx, Δy, Δz).

Eighth Embodiment

Figure 5:
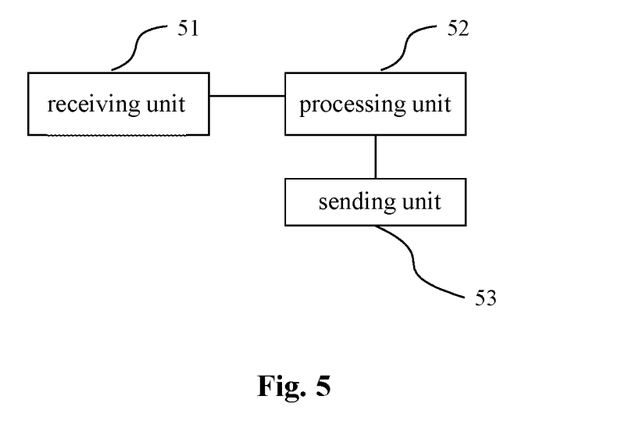
FIG. 5 is a schematic structure diagram of a positioning server provided according to an embodiment of the invention.

FIG. 5 is a schematic structure diagram of a positioning server provided according to an embodiment. The positioning server may implement the method for positioning the terminal provided according to any embodiment. Only the structure of the positioning server is described in this embodiment, and the working principle thereof may refer to the method embodiments.

As shown in FIG. 5, the positioning server in this embodiment may include a receiving unit 51 and a processing unit 52. The receiving unit 51 is configured to receive three-dimensional positioning measurement information sent by a terminal, and the processing unit 52 is configured to derive three-dimensional location information of the terminal based on the three-dimensional positioning measurement information received by the receiving unit 51.

Furthermore, the positioning server further includes a sending unit 53 configured to send three-dimensional positioning capability request information to the terminal. The receiving unit 51 is further configured to receive three-dimensional positioning capability information of the terminal returned by the terminal based on the three-dimensional positioning capability request information. Correspondingly, the processing unit 52 is further configured to instruct the sending unit 53 to send to the terminal an instruction for acquiring the three-dimensional positioning measurement information corresponding to the three-dimensional positioning capability information based on the three-dimensional positioning capability information received by the receiving unit 51.

Furthermore, the receiving unit 51 is configured to receive altitude reference information for obtaining an altitude value of the terminal, which is obtained by the terminal and sent by the terminal. Correspondingly, the processing unit 52 is configured to obtain two-dimensional location information of the terminal and derive the three-dimensional location information of the terminal based on the two-dimensional location information and the altitude reference information received by the receiving unit 51.

Furthermore, the receiving unit 51 is configured to receive three-dimensional displacement information of the terminal sent by the terminal. Correspondingly, the processing unit 52 is configured to derive the three-dimensional location information of the terminal based on the three-dimensional displacement information of the terminal received by the receiving unit 51.

Furthermore, the sending unit 53 in the positioning server is further configured to, in a case that the three-dimensional positioning measurement information is a relative measurement result relative to a reference point, send reference point information to the terminal in such a way that the terminal acquires the three-dimensional positioning measurement information based on the reference point information.

The positioning server in this embodiment receives the three-dimensional positioning measurement information reported by the terminal and calculates the three-dimensional location information of terminal based on the three-dimensional positioning measurement information. In this way, the problem in the conventional technology that only two-dimensional location information of the terminal can be obtained is solved, and the positioning of the terminal is more accurate.

Ninth Embodiment

Figure 6:
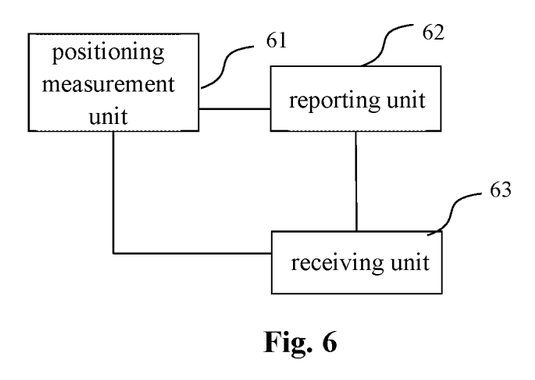
FIG. 6 is a schematic structure diagram of a terminal provided according to an embodiment of the invention.

FIG. 6 is a schematic structure diagram of a terminal provided according to an embodiment. The terminal may implement the method for positioning the terminal provided according to any embodiment of the invention. Only the structure of the terminal is described in this embodiment, and the working principle thereof may refer to the method embodiments.

As shown in FIG. 6, the terminal in this embodiment may include a positioning measurement unit 61 and a reporting unit 62. The positioning measurement unit 61 is configured to perform a positioning measurement to obtain three-dimensional positioning measurement information. The reporting unit 62 is configured to send the three-dimensional positioning measurement information obtained by the positioning measurement unit 61 to a positioning server in such a way that the positioning server derives three-dimensional location information of the terminal based on the three-dimensional positioning measurement information.

Furthermore, the terminal may further include a receiving unit 63 configured to receive three-dimensional positioning capability request information sent by the positioning server. The reporting unit 62 is further configured to send the three-dimensional positioning capability information of the terminal to the positioning server based on the three-dimensional positioning capability request information received by the receiving unit 63. The receiving unit 63 is further configured to receive an instruction for acquiring the three-dimensional positioning measurement information corresponding to the three-dimensional positioning capability information, which is sent to the terminal by the positioning server based on the three-dimensional positioning capability information, to inform the positioning measurement unit 61 to perform the positioning measurement based on the instruction.

Furthermore, the receiving unit 63 in this terminal is further configured to acquire reference point information. Correspondingly, the positioning measurement unit 61 is configured to acquire the three-dimensional positioning measurement information relative to a reference point based on the reference point information.

Furthermore, the receiving unit 63 is configured to receive the reference point information sent by the positioning server or acquire the reference point information from the terminal itself. The reporting unit 62 is further configured to send the reference point information to the positioning server in a case that the receiving unit receives the reference point information from the terminal itself.

Furthermore, the reporting unit 62 in this terminal is configured to send the three-dimensional positioning measurement information to the positioning server when the receiving unit 63 receives the instruction for acquiring the three-dimensional positioning measurement information sent by the positioning server, or send the three-dimensional positioning measurement information to the positioning server according to a preset reporting period.

Furthermore, the reporting unit 62 in this terminal is further configured to send three-dimensional positioning measurement failure information to the positioning server in a case that the positioning measurement unit 61 fails to obtain the three-dimensional positioning measurement information.

The terminal provided according to this embodiment reports the three-dimensional positioning measurement information to positioning server, and the positioning server calculates the three-dimensional location information of the terminal based on the reported three-dimensional positioning measurement information. In this way, the problem in the conventional technology that only two-dimensional location information of the terminal can be obtained is solved, and the positioning of the terminal is more accurate.

Tenth Embodiment

A system for positioning a terminal is provided according to the embodiment. The system includes the positioning server provided according to any embodiment and the terminal provided according to any embodiment. The structures and working principles of the positioning server and the terminal may refer to the device embodiments and method embodiments. The system can determine the three-dimensional location information of the terminal and can position the terminal more accurately.

It may be understood by those skilled in the art that part or all of the procedures for implementing the method embodiments may be realized by hardware related to program instructions. The foregoing program may be stored in a computer-readable storage medium. The procedures in the foregoing method embodiments are implemented when the program is executed. The foregoing storage medium may be medium which can store program codes, such as a ROM, a RAM, a disk or an optical disk.

It should be noted that, the foregoing embodiments are only used to illustrate the technical solutions, rather than limit the embodiments. Although the invention is described in detail by referring to the foregoing embodiments, it should be understood by those skilled in the art that modifications may be made to the technical solutions described in the foregoing embodiments or equivalent substitutions may be made to part of all of the technical features of the technical solutions, and these modifications and equivalent substitutions do not cause the essence of the technical solutions to deviate from the protection scope of the embodiments.

What is claimed is:

1. A positioning method, the method comprising:
    receiving, by a terminal, a capability request message from a positioning server, the capability request message including three-dimensional positioning capability request information for the terminal;
    sending, by the terminal, a capability report message to the positioning server, the capability report message including three-dimensional positioning capability information of the terminal, wherein the three-dimensional positioning capability information of the terminal comprises an altitude measurement capability of the terminal or a three-dimensional measurement capability of the terminal;
    receiving, by the terminal, an instruction from the positioning server for acquiring three-dimensional positioning measurement information of the terminal; and
    sending, by the terminal, the three-dimensional positioning measurement information of the terminal to the positioning server, wherein the three-dimensional positioning measurement information of the terminal comprises:
    1) a barometric pressure value of the terminal,
    2) an altitude value of the terminal obtained by performing a calculation on the barometric pressure value of the terminal, or
    3) a value of a motion trail of the terminal.

2. The positioning method according to claim 1, further comprising:
    receiving, by the terminal, a LTE Positioning Protocol (LPP) positioning identifier (ID), wherein the LPP positioning ID is an identifier of a positioning process.

3. The method according to claim 1, wherein the sending, by the terminal, the capability report message comprises:
    sending, by the terminal, the capability report message including the three-dimensional positioning measurement information of the terminal to the positioning server in response to the instruction; or
    sending, by the terminal, the capability report message including the three-dimensional positioning measurement information of the terminal to the positioning server according to a preset reporting period.

4. The positioning method according to claim 1, wherein the method further comprises:
    sending, by the terminal, three-dimensional positioning measurement failure information to the positioning server in response to the terminal failing to obtain the three-dimensional positioning measurement information of the terminal.

5. An apparatus, comprising a processor and a transceiver, wherein the processor controls the transceiver to:
    receive a capability request message from a positioning server, the capability request message including three-dimensional positioning capability request information of the apparatus;
    send a capability report message to the positioning server, the capability report message including three-dimensional positioning capability information of the apparatus wherein the three-dimensional positioning capability information of the apparatus comprises an altitude measurement capability of the apparatus or a three-dimensional measurement capability of the apparatus;
    receive an instruction from the positioning server for acquiring three-dimensional positioning measurement information of the apparatus; and
    send the three-dimensional positioning measurement information of the apparatus to the positioning server, wherein the three-dimensional positioning measurement information of the apparatus comprises:
    1) a barometric pressure value of the apparatus,
    2) an altitude value of the apparatus obtained by performing a calculation on the barometric pressure value of the apparatus, or
    3) a value of a motion trail of the apparatus.

6. The apparatus according to claim 5, wherein the processor further controls the transceiver to receive a LTE Positioning Protocol (LPP) positioning identifier (ID), and wherein the LPP positioning ID is an identifier of a positioning process.

7. The apparatus according to claim 5, wherein the processor further controls the transceiver to
send the capability report message including the three-dimensional positioning measurement information of the apparatus to the positioning server in response to the instruction; or
send the capability report message including the three-dimensional positioning measurement information of the apparatus to the positioning server according to a preset reporting period.

8. The apparatus according to claim 5, wherein the transceiver is further configured to send three-dimensional positioning measurement failure information to the positioning server in response to the apparatus failing to obtain the three-dimensional positioning measurement information of the apparatus.

9. The apparatus according to claim 5, wherein the apparatus is a terminal device.

10. A non-transitory computer readable storage medium, comprising computer program codes which, when executed by a processor, causes the processor to execute steps comprising:
receiving a capability request message from a positioning server, the capability request message including three-dimensional positioning capability request information for a terminal;
sending a capability report message to the positioning server, the capability report message including three-dimensional positioning capability information of the terminal, wherein the three-dimensional positioning capability information of the terminal comprises an altitude measurement capability of the terminal or a three-dimensional measurement capability of the terminal;
receiving, an instruction from the positioning server for acquiring three-dimensional positioning measurement information of the terminal; and
sending the three-dimensional positioning measurement information of the terminal to the positioning server, wherein the three-dimensional positioning measurement information of the terminal comprises:
1) a barometric pressure value of the terminal,
2) an altitude value of the terminal obtained by performing a calculation on the barometric pressure value of the terminal, or
3) a value of a motion trail of the terminal.

11. The non-transitory computer readable storage medium according to claim 10, further comprising computer program codes which, when executed by the processor, causes the processor to execute steps further comprising:
receiving a LTE Positioning Protocol (LPP) positioning identifier (ID), wherein the LPP positioning ID is an identifier of a positioning process.

12. The non-transitory computer readable storage medium according to claim 10, wherein the capability report message comprises:
sending the capability report message including the three-dimensional positioning measurement information of the terminal to the positioning server in response to the instruction; or
sending the capability report message including the three-dimensional positioning measurement information of the terminal to the positioning server according to a preset reporting period.

13. The non-transitory computer readable storage medium according to claim 10, further comprising computer program codes which, when executed by the processor, causes the processor to execute steps further comprising:
sending three-dimensional positioning measurement failure information to the positioning server in response to the terminal failing to obtain the three-dimensional positioning measurement information of the terminal.

* * * * *

UNITED STATES PATENT AND TRADEMARK OFFICE
CERTIFICATE OF CORRECTION

PATENT NO. : 10,976,399 B2
APPLICATION NO. : 16/154024
DATED : April 13, 2021
INVENTOR(S) : Cui et al.

It is certified that error appears in the above-identified patent and that said Letters Patent is hereby corrected as shown below:

On the Title Page

Item (56), U.S. Patent Documents, Citation 2: "6,999,780 B1 2/2006 Wei" should read -- 6,999,780 B1 2/2006 Zhao --.

Page 2, item (56), U.S. Patent Documents, Citation 11: "2003/0216142 A1 11/2003 Torbjorn et al." should read -- 2003/0216142 A1 11/2003 Wigren --.

Signed and Sealed this
Twenty-fourth Day of May, 2022

Katherine Kelly Vidal
*Director of the United States Patent and Trademark Office*